(12) United States Patent
Banno

(10) Patent No.: US 12,422,994 B2
(45) Date of Patent: Sep. 23, 2025

(54) INFORMATION PROCESSING DEVICE

(71) Applicant: TOYOTA JIDOSHA KABUSHIKI KAISHA, Toyota (JP)

(72) Inventor: Masahide Banno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/638,192

(22) Filed: Apr. 17, 2024

(65) Prior Publication Data

US 2025/0004646 A1    Jan. 2, 2025

(30) Foreign Application Priority Data

Jun. 27, 2023   (JP) ................ 2023-104780

(51) Int. Cl.
*G06F 12/00* (2006.01)
*G06F 3/06* (2006.01)

(52) U.S. Cl.
CPC .......... *G06F 3/0613* (2013.01); *G06F 3/0604* (2013.01); *G06F 3/0623* (2013.01); *G06F 3/0646* (2013.01)

(58) Field of Classification Search
CPC .... G06F 3/0613; G06F 3/0604; G06F 3/0623; G06F 3/0646; H04L 67/01; H04L 67/06; H04L 67/10; H04L 67/12; H04L 67/54; H04L 67/14; H04L 43/0811
See application file for complete search history.

(56) References Cited

U.S. PATENT DOCUMENTS

| 2022/0253234 A1 | 8/2022 | Mizutani | |
| 2023/0086171 A1* | 3/2023 | Grix | H04L 67/125 |
| | | | 455/420 |
| 2024/0333795 A1* | 10/2024 | Thao | G06F 9/547 |

FOREIGN PATENT DOCUMENTS

JP    2022-121156 A    8/2022

\* cited by examiner

*Primary Examiner* — Shawn X Gu
(74) *Attorney, Agent, or Firm* — Oliff PLC

(57) ABSTRACT

The information processing device acquires architecture model information including information representing communication paths for aggregating communication paths between ECU in a plurality of types of vehicles and data communication standards capable of transmitting and receiving data on respective communication paths, acquires variation information including information specifying necessary communication paths necessary for a particular vehicle and information specifying data necessary to be transmitted and received through a necessary communication path, generates a communication specification specifying a relationship between the necessary data and a communication path to which the necessary data should be transmitted based on the architecture model information and the variation information, and specifies a communication path for each necessary data, and specifies a communication path for each necessary data so as to satisfy a data communication standard defined for each necessary data when generating a communication specification.

6 Claims, 2 Drawing Sheets

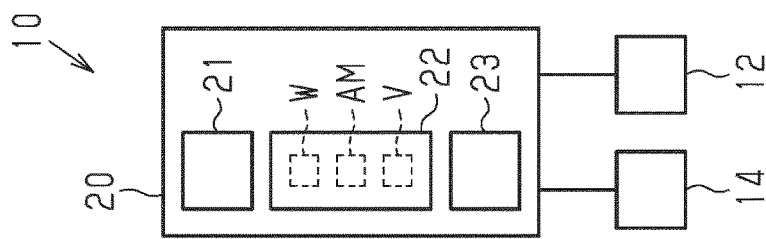
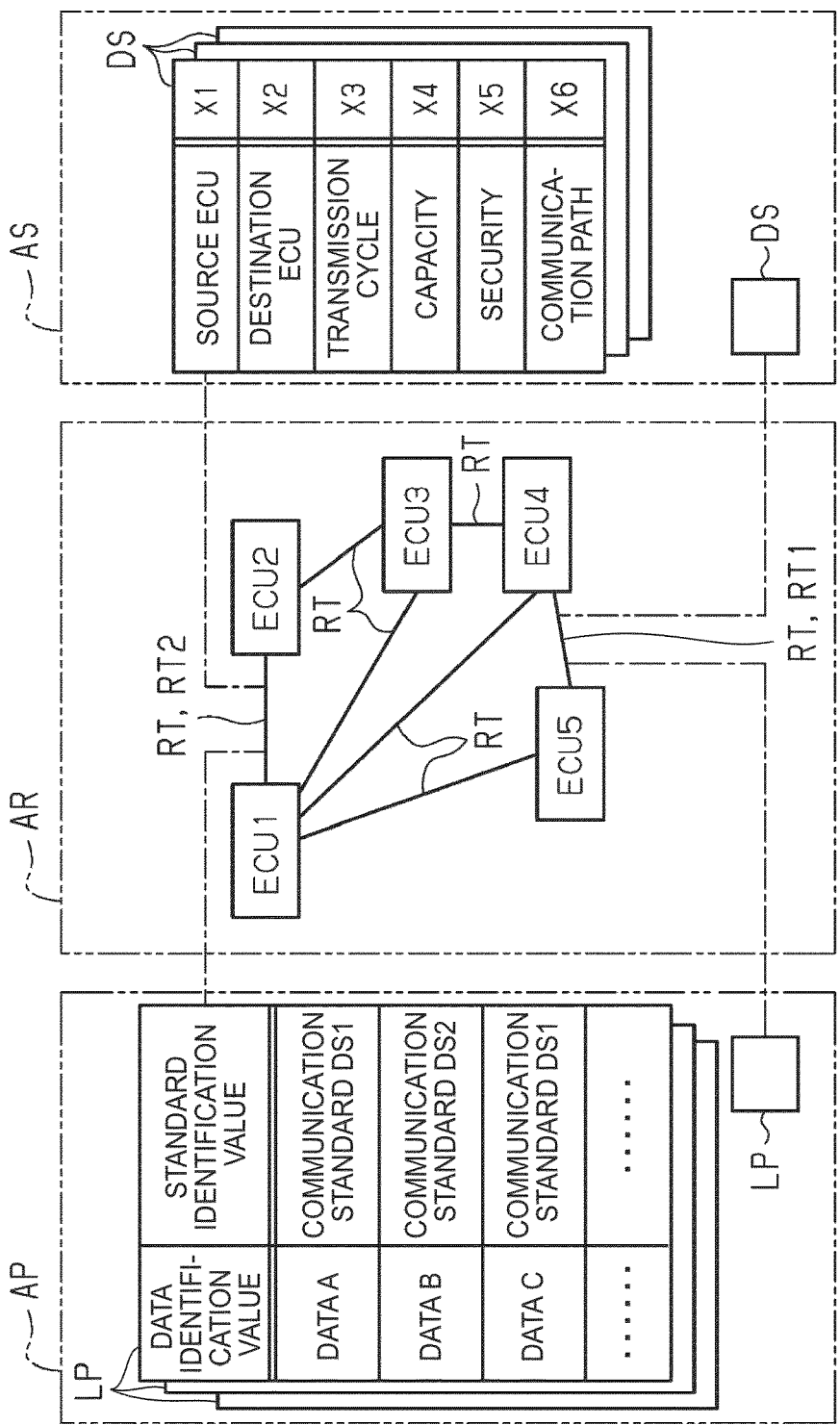

INFORMATION PROCESSING DEVICE

CROSS-REFERENCE TO RELATED APPLICATION

This application claims priority to Japanese Patent Application No. 2023-104780 filed on Jun. 27, 2023, incorporated herein by reference in its entirety.

BACKGROUND

1. Technical Field

The present disclosure relates to an information processing device.

2. Description of Related Art

A vehicle disclosed in Japanese Unexamined Patent Application Publication No. 2022-121156 (JP 2022-121156 A) includes a plurality of electronic control units (ECUs). The ECUs are connected to each other via a bus. The ECUs exchange necessary data via the bus.

SUMMARY

In the vehicle of JP 2022-121156 A including the plurality of ECUs, the type of the ECUs mounted on the vehicle varies depending on the type of the vehicle. The communication path between the ECUs and the data communication standard between the ECUs vary depending on the type of the ECUs mounted on the vehicle. Therefore, when a vehicle including a plurality of ECUs is newly designed, it is necessary to redesign communication rules such as data transmission timings in consideration of a communication path adopted in the vehicle and a type of data that needs to be exchanged via the communication path. A large number of ECUs are mounted on a vehicle. Hitherto, designers have designed communication rules for each vehicle in consideration of combinations of the large number of ECUs. Therefore, a great deal of effort has been required to design the communication rules for each vehicle.

An information processing device for solving the above problem is configured to:
  acquire architecture model information including information on an aggregate of communication paths between electronic control units in a plurality of types of vehicle and information indicating, for each of the communication paths, one or more data communication standards with which data is exchangeable in each of the communication paths;
  acquire variation information including information specifying a necessary communication path that is necessary for a specific vehicle and information specifying necessary data that needs to be exchanged through the necessary communication path;
  generate a communication specification specifying a relationship between the necessary data and the communication path through which the necessary data is to be transmitted based on the architecture model information and the variation information; and
  specify, in generation of the communication specification, the communication path for each piece of the necessary data to satisfy the data communication standard defined for each piece of the necessary data.

According to the above technical idea, it is possible to obtain the communication specification of the specific vehicle without imposing a great deal of effort on the designers.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic configuration diagram of a design system;

FIG. 2 is a diagram schematically illustrating architecture model information;

DETAILED DESCRIPTION OF EMBODIMENTS

Figure 3:
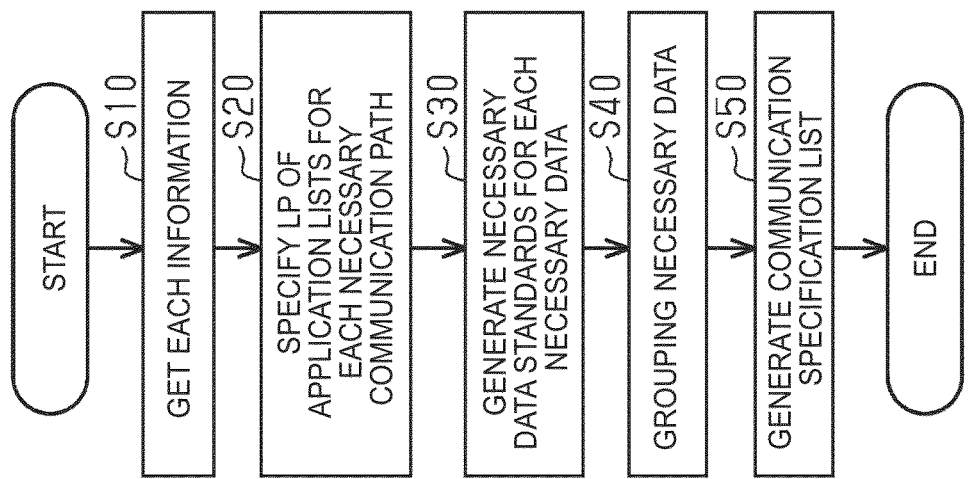
FIG. 3 is a flowchart illustrating a processing procedure of the specification generation processing.

Hereinafter, an embodiment of an information processing device will be described with reference to the drawings.

Overall Configuration

The design system 10 illustrated in FIG. 1 is installed, for example, in a design facility of a vehicle. The design system 10 includes an information processing device 20, a display 12, and an input device 14.

The information processing device 20 is a so-called computer. The information processing device 20 includes a CPU 21, a database 22, and a primary storage device 23. The database 22 is a non-volatile memory. The primary storage device 23 is a volatile memory. The database 22 stores in advance a program W in which a process to be executed by CPU 21 is described. In addition, the database 22 stores the architecture model information AM in advance. The architecture model information AM will be described in detail later.

The display 12 is capable of communicating with the information processing device 20. The display 12 displays an image corresponding to a signal outputted by CPU 21 of the information processing device 20. The input device 14 is capable of communicating with the information processing device 20. The input device 14 is for inputting information from the outside to the information processing device 20. The input device 14 is, for example, a keyboard and a mouse.

CPU 21 of the information processing device 20 can execute the specification-generating process by executing the program W stored in the database 22. The specification generation process is a process for generating a communication specification in the vehicle. The specification generation process is used when the designer designs a new vehicle. Here, the vehicle to be designed includes a plurality of in-vehicle devices and a plurality of ECU for controlling these in-vehicle devices. The communication specification specifies a relation between data exchanged between these ECU and a communication path RT to be used in data exchange. In the present embodiment, one communication path RT is defined as follows. That is, one communication path RT is a path connecting two ECUs. One ECU is an ECU that is a source of data. The other ECU is an ECU to which data is to be transmitted. ECU is an abbreviation for "Electronic Control Unit".

Architecture Model Information

As illustrated in FIG. 2, the architecture model information AM includes a total route information AR, a total standard information AS, and an application information AP.

The total route information AR is information obtained by aggregating communication path RT between ECU in a plurality of types of vehicles. In FIG. 2, the total route information AR is schematically represented. Also, in FIG. 2, only five of the plurality of ECU are represented. The plurality of types of vehicles in the present embodiment are all types of vehicles that can be realized, including, for example, all types of vehicles sold by a specific vehicle manufacturer and all types of vehicles that are expected to be designed in the future. The communication path RT aggregated in the total route information AR is obtained by collecting patterns of the communication path RT adopted in the respective vehicle types for all the types of vehicles.

For example, the total route information AR is a tabular summary of the communication path RT schematically represented in FIG. 2. For example, the tables summarize four identities prepared for one communication path RT for each communication path RT. The four identification values are the path identification value, the first identification value, the second identification value, and the transit identification value. The path identification value is an identification value for each communication path RT assigned to each communication path RT. The first identification value is an ECU identification value of one of two ECUs to which the target communication path RT is connected. The second identification value is an ECU identification value of the other of the two ECUs to which the target communication path RT is connected. The route identification value is an identification value indicating a route pattern when the target communication path RT passes through another ECU for relay between two ECUs. As can be seen from the existence of the through-identification values, for example, for the two ECUs of ECU 1 and ECU 3 shown in FIG. 2, there are a plurality of communication path RT connecting them. ECU identification value is an identification value f or each ECU assigned to each ECU.

The total standard information AS is a summary of all communication path RT of the data communication standard DS prepared for each communication path RT. The data communication standard DS is a tabular summary of communication standards capable of transmitting and receiving data in each communication path RT. One or more data communication standard DS are provided per communication path RT. For example, in the communication path RT1 illustrated in FIG. 2, only one data communication standard DS is prepared. On the other hand, in the communication path RT2 illustrated in FIG. 2, a plurality of data communication standard DS are prepared. The respective data communication standard DS are assigned individual standard identifications. When a plurality of data communication standard DS are prepared for one communication path RT, the standard identifications of the plurality of data communication standard DS are different from each other. The standard identification values of the respective data communication standards DS are associated with information indicating the communication path RT in the total route information AR, that is, the path identification values.

The following items are defined in the data communication standard DS. The plurality of items are an ECU of a transmission source of data, an ECU of a transmission destination of data, a transmission cycle of data, a capacity of data per transmission/reception, a security level, and a communication path RT targeted by the data communication standard DS. Among the plurality of items, ECU of the data source, ECU of the data destination, and the communication path RT are represented by the identification values described above. In the present embodiment, the security level is either "0" or "1". When the security level is "0", it means that the addition of security information to the data is unnecessary. A security level of "1" means that security information needs to be given to data. As described above, a plurality of data communication standard DS may be prepared for one communication path RT. In this case, in the plurality of data communication standard DS, there are items in which common contents are set and items in which different contents can be set. The items in which the same content is set are ECU of the data transmission source, ECU of the data transmission destination, and the communication path RT. Items for which different contents can be set are the transmission period of the data, the capacity of the data, and the security level.

The application-information AP is a summary of all communication path RT of application-list LP prepared for each communication path RT. Here, there are a plurality of types of data transmitted and received in one communication path RT. In the above application list LP, a correspondence relation between a type of data transmitted and received in one communication path RT and a data communication standard DS to be used when transmitting and receiving data of the type is determined for each type of data. The type of data referred to here is, for example, the type of each parameter detected by each sensor such as an intake air amount and a fuel injection amount. As shown in FIG. 2, in the application-list LP, data identification values of a plurality of types of data transmitted and received by a certain communication path RT are associated with standard identification values of data communication standards DS applied to the respective data. The data identification value is an identification value for each data assigned to each data.

As described in the above-described total standard information AS, in one communication path RT, there are cases where only one data communication standard DS is set and cases where a plurality of data communication standard DS are set. All the data transmitted and received in the communication path RT is transmitted and received in the same data communication standard DS when only one data communication standard DS is set for one communication path RT. Reflecting this point, for example, as in the communication path RT1 shown in FIG. 2, in this communication path RT when only one data communication standard DS is set for one communication path RT, only one application list LP is prepared.

On the other hand, as in the communication path RT2 shown in FIG. 2, for example, when a plurality of data communication standards DS are set for one communication path RT, the respective data transmitted and received in the communication path RT are transmitted and received using various data communication standard DS. There are various types of data communication standard DS to be applied to various types of data. Specifically, for example, even if data of the same type is used, DS of data communication standards to be applied when the data is transmitted may be different depending on differences in various programs applied to vehicles. Reflecting this point, for the communication path RT when a plurality of data communication standard DS are prepared for one communication path RT, a plurality of application lists LP are prepared. In each application-list LP, a plurality of data communication standard DS are allocated to each data differently. For example, it is assumed that two of a plurality of application-list LP prepared for the communication path RT1 are compared. In one application list LP, the first data communication standard DS1 is assigned to the data "A" and the data "C", and the second data communication standard DS2 is assigned to the data "B". On the other hand, in the other application list LP, the first data communication standard DS1 is assigned to the data "A" and the data "B", and the second data communication standard DS2 is assigned to the data "C". In this manner, the allocation method of the data communication standard DS to the respective data is different for each application list LP. It should be noted that individual application identification values are assigned to the application list LP. Similar to the data communication standard DS, when a plurality of application list LP are prepared for one communication path RT, the application identifying values of the plurality of application list LP are different from each other. The application identification values of the application list LP are associated with information indicating the communication path RT in the total route information AR, that is, the path identification values.

Variation Information

The designer creates the variation information V in advance when generating the communication specification of the new vehicle by using the specification generation process. The variation information V is information for designating basic information of communication in a specific vehicle to be designed. Specifically, the variation information V includes information specifying a plurality of necessary communication paths and information specifying a plurality of necessary data. The necessary communication path is communication path RT required in the vehicles to be designed. The necessary data is data that needs to be exchanged through a necessary communication path. The information specifying the necessary communication path is, for example, a path identification value indicating the necessary communication path. The information specifying the necessary data is, for example, a data identification value indicating the necessary data. The necessary communication path and the necessary data are basically determined by the types of the plurality of in-vehicle devices mounted on the vehicle to be designed. That is, when the types of the plurality of in-vehicle devices to be mounted on the vehicle are determined, the plurality of ECU required for controlling the in-vehicle devices are determined. When a plurality of ECU to be mounted on vehicles are determined, a communication path RT connecting the plurality of ECU is determined. When a plurality of ECU to be mounted on vehicles are determined, the necessary data is determined based on the balance with the processing content performed by ECU. From this point of view, a plurality of necessary communication paths and a plurality of necessary data are defined. Then, the plurality of necessary data designated by the variation information V is only those that can be transmitted by any one of the plurality of necessary communication paths designated by the variation information V. However, in the variation information V, which communication path RT is used to transmit the necessary data is not specified. Here, when a plurality of necessary communication paths and a plurality of necessary data to be used in the design vehicle are determined, a transmission cycle required for each necessary data, a capacity of data per transmission and reception, and a security level are also determined. Accordingly, in the variation information V of the present embodiment, these three items are also designated for each necessary data.

Details of Specification Generation Processing

After creating the variation information V, the designer stores the created variation information V in the database 22 of the information processing device 20. Thereafter, the designer instructs CPU 21 of the information processing device 20 to execute the specification-generation process. In response to this instruction, CPU 21 starts the specification-generation process. Note that, although not described in detail, in the specification generation process, CPU 21 identifies the communication path RT and the like by referring to the various identification values indicated by the architecture model information AM and the variation information V. Further, although not described in detail, CPU 21 appropriately uses the primary storage device 23 in the specification generation process.

As shown in FIG. 3, when CPU 21 starts the specification generation process, CPU 21 first executes S10 process. In S10, CPU 21 obtains the architecture model information AM from the database 22. Further, CPU 21 acquires the variation information V from the database 22. After that, CPU 21 advances the process to S20. In S10, CPU 21 may acquire the architecture model information AM and the variation information V from an external server that is an information processing device that differs from the information processing device 20. In this case, the architecture model information AM and the variation information V may be stored in the external servers. Then, the information processing device 20 and the external server may be communicable with each other.

In S20, CPU 21 specifies the application list LP for each necessary communication path specified by the variation information V. Specifically, CPU 21 first identifies a plurality of necessary communication paths designated by the variation information V from among all communication path RT included in the total route information AR of the architecture model information AM. Then, CPU 21 performs the following operations for each specified necessary communication path. That is, CPU 21 specifies the application list LP associated with the necessary communication path from the application information AP of the architecture model information AM. When a plurality of application list LP are prepared for the target necessary communication path, CPU 21 identifies one optimal application list LP in the plurality of application list LP based on the combination of necessary communication paths and the combination of necessary data specified by the variation information V. When CPU 21 identifies one application-list LP for one necessary communication path, the process proceeds to S30.

In S30, CPU 21 generates a necessary data standard DSX for each necessary data specified by the variation information V. Specifically, in S30, CPU 21 performs the following process. That is, CPU 21 uses the application-list LP for each necessary communication path specified by S20 to specify the data communication standard DS corresponding to the necessary data specified by the variation information V. For example, one of the plurality of necessary data is referred to as first data. For this first data, CPU 21 refers to the application list LP including the data identification value of the first data in the application list LP specified by S20.

Then, CPU 21 specifies the standard identification value corresponding to the first data based on the application list LP. Then, CPU 21 specifies the data communication standard DS corresponding to the specified standard identification value from the total standard information AS of the architecture model information AM. Then, CPU 21 adds the data identification value of the first data to the specified data communication standard DS. A set of data communication standard DS and data identifiers thus obtained is treated by CPU 21 as the necessary data standard DSX for the first data. Depending on the combination of the necessary data and the necessary communication path specified by the variation information V, the following may be possible. That is, there are a plurality of cases in which a plurality of routes capable of transmitting the first data exist among the plurality of necessary communication paths designated by the variation information V. In this plurality of cases, there is an application list LP including the data identification values of the first data by the number of routes that can transmit the first data. Therefore, in a plurality of cases, CPU 21 selects the data communication standard DS corresponding to any one of the plurality of application-list LP based on the following criteria. In other words, CPU 21 selects the data communication standard DS that corresponds to the transmission period, the data volume, and the security level specified for the first data in the variation information V. If this selection still fails to narrow down the data communication standard DS to one, CPU 21 performs further narrowing down. That is, CPU 21 selects one data communication standard DS from the plurality of data communication standard DS narrowed down by the above criteria according to a predetermined rule. The predetermined rule is, for example, to select a data communication standard DS corresponding to the shortest route among a plurality of routes through which the first data can be transmitted. The predetermined rule may be determined from the viewpoint of efficiently performing the communication of the vehicle. CPU 21 generates the necessary data standard DSX for all the necessary data specified by the variation information V in the same manner as the first data described above. Then, CPU 21 obtains one necessary data standard DSX for one necessary data. After that, CPU 21 advances the process to S40.

In S40, CPU 21 performs grouping of a plurality of pieces of necessary data specified by the variation information V. In performing this grouping, CPU 21 refers to the necessary data standard DSX for each necessary data generated by S30. Note that in the following description, a point in which CPU 21 refers to the necessary data standard DSX is not described in detail.

Figure 4:
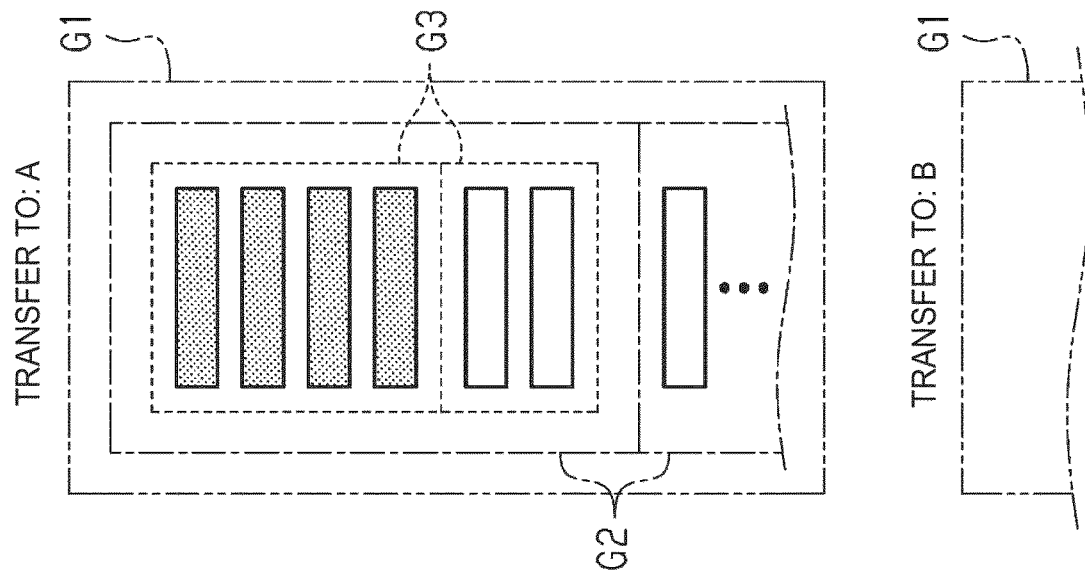
FIG. 4 is a schematic representation of aspects of grouping necessary data.
Figure 5:
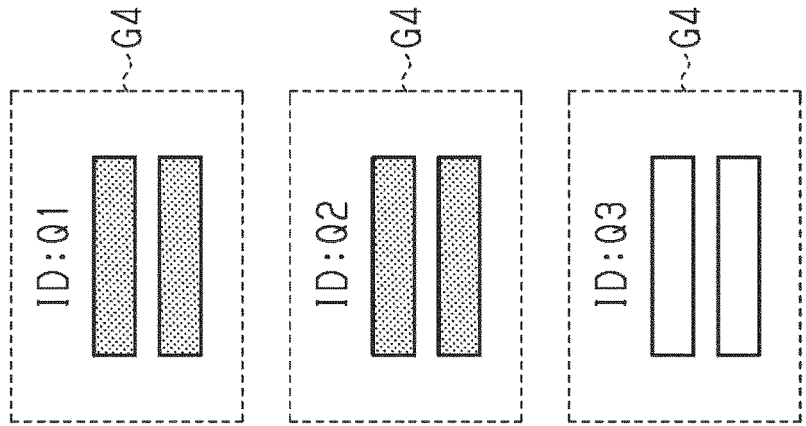
FIG. 5 is a diagram schematically illustrating an aspect of grouping necessary data.

The process of S40 will be described in detail. First, CPU 21 specifics a group of a plurality of pieces of necessary data that satisfy the precondition that ECU of the transmission source is the same. As a result, CPU 21 divides the plurality of necessary data into a plurality of groups. After that, CPU 21 further performs the following process for each group grouped according to the preconditions. The details of this processing will be described with reference to FIG. 4 and FIG. 5. In FIG. 4 and FIG. 5, solid squares represent necessary data.

First, when there are a plurality of pieces of necessary data satisfying the first condition among the plurality of pieces of necessary data satisfying the prerequisite condition, CPU 21 designates a group of the plurality of pieces of necessary data satisfying the first condition as one group. As a result, as indicated by the two-dot chain line G1 in FIG. 4, CPU 21 divides the plurality of necessary data satisfying the prerequisite into a plurality of groups. The first criterion is that the necessary data standard DSX defined in the necessary data standard has the same ECU and the communication path RT defined in the necessary data standard DSX is the same.

Further, when there are a plurality of pieces of necessary data satisfying the second condition among the plurality of pieces of necessary data satisfying the first condition, CPU 21 designates a group of the plurality of pieces of necessary data satisfying the first condition and the second condition as one group. As a result, as indicated by the dashed-dotted line G2 in FIG. 4, CPU 21 divides the plurality of necessary data satisfying the first criterion into a plurality of groups. The second criterion is that the transmission periods defined in the necessary data standard DSX are the same.

Further, when there are a plurality of pieces of necessary data satisfying the third condition among the plurality of pieces of necessary data satisfying the first condition and the second condition, CPU 21 designates a group of the plurality of pieces of necessary data satisfying the first condition, the second condition, and the third condition as one group. As a result, as indicated by the dotted line G3 in FIG. 4, CPU 21 divides the plurality of necessary data satisfying the first condition and the second condition into a plurality of groups. The third criterion is that the security-level defined in the necessary data standard DSX is the same. In FIG. 4, necessary data whose security level is "0" is shown in white. In FIG. 4, necessary data having a security level of "1" is shown in black.

After that, CPU 21 performs the following on a group of the plurality of necessary data satisfying the first condition, the second condition, and the third condition. That is, as indicated by the dotted line G4 in FIG. 5, CPU 21 groups the plurality of necessary data satisfying the first condition, the second condition, and the third condition so that the total capacity of the plurality of necessary data included in one group is equal to or smaller than the set capacity. The set capacity is the maximum value of the total capacity of the necessary data allowed in one transmission and reception. In FIG. 5, the six necessary data surrounded by the dotted line G3 in FIG. 4 are divided into two groups. In FIG. 5, as in FIG. 4, necessary data is shown in white or black depending on the security level.

After that, CPU 21 assigns individual group identification value ID to the groups. In FIG. 5, the group identification value ID is represented by "Q1", "Q2", and "Q3". For example, there may be necessary data that cannot be grouped due to the fact that the first condition or the second condition is not satisfied. For these necessary data, CPU 21 will give it a separate group identification value ID alone. As illustrated in FIG. 3, CPU 21 assigns the group identification value ID to the respective groups, and then advances the process to S50.

In S50, CPU 21 generates a communication specification list. The communication specification list is a summary of communication specifications specifying the relation between various necessary data and the communication path RT to which each necessary data is to be transmitted. Specifically, the communication specification list is a table in which the settings related to the communication are summarized for each group finally grouped by S40. The setting content includes a group identification value ID, an ECU of a transmission source, an ECU of a transmission destination, a communication path RT to be used, a transmission cycle, a security level, necessary data to be transmitted, and necessity of grouping. For each group, CPU 21 generates a communication specification list reflecting the content of the necessary data standard DSX of each necessary data included in each group. CPU 21 indicates, of the setting content of the communication specification list, ECU of the transmission source, ECU of the transmission destination, RT of the communication path to be used, and various types of necessary data to be transmitted by using the identification values described above. CPU 21 indicates whether or not grouping is necessary by a dedicated identifier. When the identification value indicates the necessity, it is specified that communication is performed in a data set in which each necessary data to be transmitted is grouped. Note that CPU 21 sets whether or not to group necessary data that cannot be grouped by S40, and specifies only one necessary data to be transmitted. After generating the communication specification list, CPU 21 displays a message indicating that the communication specification list has been generated on the display 12. CPU 21 may display the content of the communication specification on the display 12. When the content of the communication specification list is displayed on the display 12, CPU 21 converts the identification values represented in the communication specification list into actual ECU names and displays them on the display 12. When CPU 21 performs the required display on the display 12, the process of S50 ends. At the same time, CPU 21 ends the specification-generation process.

As described above, CPU 21 generates the communication specification list from S10 through S50 process. In S50 process from these S10, CPU 21 generates a communication specification list based on the architecture model information AM and the variation information V.

Operations of Embodiment

CPU 21 generates a necessary data standard DSX for each necessary data in S30. In the necessary data standard DSX, a communication path RT to which the necessary data of the target is to be transmitted is defined. In S40, CPU 21 performs grouping so as to realize each of these communication path RT and to satisfy all of the other items in each of the necessary data standard DSX. That is, CPU 21 determines the communication path RT for each necessary data so as to satisfy all of the items of the data communication standard DS defined for each necessary data in the generation of the communication specification list.

Effects of Embodiment (1) When acquiring the architecture model information AM and the variation information V in the specification generation process, CPU 21 generates a communication specification list that defines the relation between the necessary communication path and the necessary data specified by the variation information V. The availability of such a specification generation process has the following advantages for the designer. That is, the designer only needs to prepare the variation information V to be adopted in the vehicle in designing the communication specification of the vehicle to be designed. Therefore, the designer can obtain a communication specification list of a new vehicle type without requiring excessive labor.

(2) It is preferable from the viewpoint of improving communication efficiency that ECU of the transmission destination can collectively transmit a plurality of pieces of necessary data which are the same. CPU 21 of the present embodiment determines that communication is performed in a data set in which a plurality of pieces of necessary data having the same destination ECU are grouped in the communication specification list. Generating such a communication specification list by CPU 21 has the following benefits to the designer. That is, it is unnecessary for the designer himself/herself to search for a combination of necessary data to be grouped in relation to the transmission destination.

(3) It is preferable that a plurality of pieces of necessary data having the same transmission period can be transmitted collectively from the viewpoint of improving communication efficiency while ensuring an appropriate transmission timing of each piece of necessary data. CPU 21 of the present embodiment determines that communication is performed using a data set in which a plurality of pieces of necessary data having the same transmission period are grouped in the communication specification list. Generating such a communication specification list by CPU 21 has the following benefits to the designer. That is, it is unnecessary for the designer himself/herself to search for a combination of necessary data to be grouped in relation to the transmission cycle.

(4) It is preferable to be able to collectively transmit a plurality of necessary data having the same security level from the viewpoint of improving communication efficiency while ensuring the security level of each necessary data. CPU 21 of the present embodiment determines that communication is performed in a data set in which a plurality of pieces of necessary data having the same security level are grouped in the communication specification list. Generating such a communication specification list by CPU 21 has the following benefits to the designer. That is, it is unnecessary for the designer himself/herself to search for a combination of necessary data to be grouped in relation to the security level.

(5) The total capacity of necessary data that can be transmitted and received at one time is predetermined. Therefore, even if a plurality of necessary data are grouped, it is preferable to set each group so as to be within the total capacity allowed by one transmission and reception. CPU 21 according to the present embodiment determines in the communication specification list that communication is performed using a data set that is grouped so that the total capacity of a plurality of pieces of necessary data included in one group is equal to or smaller than a set capacity. Generating such a communication specification list by CPU 21 has the following benefits to the designer. That is, it is unnecessary for the designer himself/herself to search for a combination of necessary data to be grouped in consideration of the capacity of necessary data.

Modifications

The above embodiment can be implemented with the following modifications. The above embodiments and the following modifications can be combined with each other within a technically consistent range to be implemented.

With regard to the grouping of necessary data, it is not essential to group the plurality of necessary data so that the total capacity of the plurality of necessary data is equal to or smaller than the set capacity. That is, a plurality of necessary data may be grouped only from the viewpoint of satisfying the first condition, the second condition, and the third condition. For each such group, the setting contents related to the communication may be represented in the communication specification list.

In grouping the necessary data, it is not necessary to consider the third condition. That is, a plurality of necessary data may be grouped only from the viewpoint of satisfying the first condition and the second condition. For each such group, the setting contents related to the communication may be represented in the communication specification list.

In grouping the necessary data, it is not essential to consider the second condition. That is, a plurality of necessary data may be grouped only from the viewpoint of satisfying the first condition. For each such group, the setting contents related to the communication may be represented in the communication specification list.

Grouping the necessary data is not mandatory. The communication specification generated in the specification generation process may be any specification that specifies the relationship between the necessary data and the communication path through which the necessary data is to be transmitted. The communication specification may not be a list.

When generating the communication specifications, it is not essential to specify or group the communication path RT for each necessary data so as to satisfy all of the items of the data communication standard DS defined for each necessary data. Among the items of the data communication standard DS defined in the necessary data, the communication path RT for each necessary data may be designated so as to satisfy the required items. The same applies to the grouping.

The content of the architecture model information AM is not limited to the exemplary embodiments described above. The architecture model information AM may include, as a whole, content corresponding to the total route information AR, the total standard information AS, and the application information AP of the above-described embodiment. The manner of representing and summarizing each information can be changed as appropriate. For example, the total standard information AS and the application information AP may not be separate but may be integrated together. The architecture model information AM may include information obtained by aggregating communication paths between ECU in a plurality of types of vehicles, and information representing one or a plurality of data communication standards capable of exchanging data on the respective communication paths for each communication path.

It is not essential to treat one communication path RT as a path connecting ECU of the data source, ECU of the data destination, and the communication path. For example, when another ECU for relay is interposed between ECU of the data transmission source and ECU of the data transmission destination, ECU from the data transmission source to the ECU for relay may be treated as one communication path RT.

The content of the data communication standard is not limited to the example of the above-described embodiment. Items defined by the data communication standard may be increased or decreased from those of the above embodiment. The data communication standard may be any standard that defines a communication standard that is necessary for exchanging data on a specific communication path.

The security level may be three or more. When three or more security levels are set, it is possible to specify the degree of security when the security information is added in addition to whether or not the security information is added to data.

The content of the variation information V is not limited to the example of the above-described embodiment. The variation information V may include information specifying a necessary communication path and information specifying necessary data. For example, the transmission cycle, the capacity of the data, and the security level for each necessary data may be eliminated from the variation information V of the above-described embodiment.

The information indicating the necessary communication path is not limited to the path identification value indicating the necessary communication path. The information indicating the necessary communication path may be any information that can indicate the necessary communication path. Similarly, the information specifying the necessary data is not limited to the data identification value indicating the necessary data.

What is claimed is:

1. An information processing device configured to:
readout architecture model information from a database, the architecture model information including information on an aggregate of communication paths between electronic control units in a plurality of types of vehicle and information indicating, for each of the communication paths, one or more data communication standards with which data is exchangeable in each of the communication paths;
readout variation information from the database, the variation information including information specifying a necessary communication path that is necessary for a specific vehicle and information specifying necessary data that needs to be exchanged through the necessary communication path; and
display, on a display, a list of a communication specification based on the architecture model information and the variation information, the list of the communication specification representing a relationship between each piece of the necessary data and a communication path through which a corresponding piece of the necessary data is to be transmitted, the relationship satisfying a data communication standard defined for each piece of the necessary data.

2. The information processing device according to claim 1, wherein when a plurality of pieces of the necessary data that satisfies a first condition that transmission destinations defined in a data communication standard are the same electronic control unit is present in the display of the communication specification, communication using a data set obtained by grouping the pieces of the necessary data that satisfy the first condition is defined in the communication specification.

3. The information processing device according to claim 2, wherein when a plurality of pieces of the necessary data that satisfies, in addition to the first condition, a second condition that data transmission periods defined in a data communication standard are the same is present in the display of the communication specification, communication using a data set obtained by grouping the pieces of the necessary data that satisfy the first condition and the second condition is defined in the communication specification.

4. The information processing device according to claim 3, wherein when a plurality of pieces of the necessary data that satisfies, in addition to the first condition and the second condition, a third condition that security levels defined in a data communication standard are the same is present in the display of the communication specification, communication using a data set obtained by grouping the pieces of the necessary data that satisfy the first condition, the second condition, and the third condition is defined in the communication specification.

5. The information processing device according to claim 4, wherein in the display of the communication specification, communication using a data set obtained by grouping the pieces of the necessary data that satisfy the first condition, the second condition, and the third condition is defined in the communication specification to achieve a state in which a total volume of the pieces of the necessary data that satisfy the first condition, the second condition and the third condition is equal to or smaller than a set volume determined in advance.

6. The information processing device according to claim 1, wherein the information processing device is further configured to convert identification values represented in the list of communication specification into electronic control unit ("ECU") names and to display the ECU names on the display.

* * * * *